United States Patent [19]

Morikawa et al.

[11] 4,180,538
[45] Dec. 25, 1979

[54] METHOD OF MAKING CERAMIC SHAPED ARTICLE FROM INORGANIC RAW MATERIAL POWDER BY EXTRUSION MOLDING

[75] Inventors: Akira Morikawa; Yoshinori Narita, both of Nagoya; Junichi Mizutani, Kuwana, all of Japan

[73] Assignee: NGK Spark Plug Co., Ltd., Nagoya, Japan

[21] Appl. No.: 759,812

[22] Filed: Jan. 17, 1977

Related U.S. Application Data

[63] Continuation of Ser. No. 570,803, Apr. 23, 1975, which is a continuation-in-part of Ser. No. 486,759, Jul. 9, 1974, abandoned.

[30] Foreign Application Priority Data

Feb. 21, 1975 [JP] Japan ................................. 50-22074

[51] Int. Cl.² ............................................. C04B 35/64
[52] U.S. Cl. ...................................... 264/63; 264/184; 264/209
[58] Field of Search ......................... 264/63, 184, 209

[56] References Cited

U.S. PATENT DOCUMENTS

| 2,593,507 | 4/1952 | Wainer | 264/63 |
| 3,790,654 | 2/1974 | Bagley | 264/209 |

Primary Examiner—Robert F. White
Assistant Examiner—John A. Parrish
Attorney, Agent, or Firm—Stevens, Davis, Miller & Mosher

[57] ABSTRACT

A method of making a ceramic shaped article from an inorganic raw material powder by extrusion molding is disclosed. The method comprises the steps of kneading an inorganic raw material powder with a plasticizer to obtain a kneaded body which is then molded by extrusion into a fluid having a high humidity to obtain a ceramic shaped article having no deformation and strain. The plasticizer is selected from the group consisting of mono-liquid type resin which is a water insoluble synthetic resin dissolved in a water soluble solvent and a hydraulic setting resin mainly consisting of polyurethane isocyanate prepolymer.

7 Claims, No Drawings

METHOD OF MAKING CERAMIC SHAPED ARTICLE FROM INORGANIC RAW MATERIAL POWDER BY EXTRUSION MOLDING

This is a Continuation of application Ser. No. 570,803 filed Apr. 23, 1975, which in turn is a Continuation-In-Part of application Ser. No. 486,759, filed July 9, 1974, now abandoned.

This invention relates to a method of making a ceramic shaped article from an inorganic raw material powder by extrusion molding, that is, a method which can make a ceramic shaped article composed of thin wall-shaped members and a ceramic shaped article composed of assembled thin wall-shaped members and complex in construction. An example of the ceramic shaped article composed of thin wall-shaped members is an insulating substrate for integrated circuit packages, while an example of the ceramic shaped article composed of assembled thin wall-shaped members and complex in construction is a honeycomb body adapted to be used for a catalyst converter system of an internal combustion engine for an automobile and catalyst carrier for an exhaust gas purifying device and the like, the honeycomb structure having a considerably large number of openings separated from each other by means of thin partition walls. Both the ceramic shaped articles are beneficial in the ceramic field.

In the case of making a ceramic shaped article from an inorganic raw material powder by extrusion molding, an elongate body extruded from a metal mold is required to have a suitable hardness which can prevent it from being deformed due to the excessive softness thereof, while the extruded elongate body is required to have a sufficient fluidity which causes it to pass through the metal mold without being subjected to nonuniformity, cracks and strain.

In practice, it is impossible to make a ceramic shaped article composed of thin wall-shaped members each having a thickness of less than about 2 mm, for example, a honeycomb body by extrusion molding without being subjected to strain, cracks and deformation after extrusion molding.

An object of the invention is to provide a method of making a ceramic shaped article from an inorganic raw material powder by extrusion molding, which can make the above mentioned ceramic shaped article composed of thin wall-shaped members enabling it to be uniform in construction and not subjected to strain, cracks and deformation after extrusion molding.

Another object of the invention is to provide a method of making a ceramic shaped article from an inorganic raw material powder by extrusion molding, which can considerably reduce the extrusion pressure in the course of extrusion molding, can freely select various kinds of metals as materials of a metal mold and hence can use the metal mold for a long time, and can effect the extrusion molding in a less expensive and mass production scale.

These and other desirable objects are attained, according to the invention, by a method of making a ceramic shaped article from an inorganic raw material powder by extrusion molding, comprising the steps of kneading an inorganic raw material powder with a plasticizer selected from the group consisting of mono-liquid type resin which is a water insoluble synthetic resin dissolved in a water soluble solvent and a hydraulic setting resin mainly consisting of polyurethane isocyanate prepolymer to form a kneaded body, and extruding said kneaded body into a fluid having a high humidity i.e., an aqueous fluid, whereby a ceramic shaped article composed of thin wall-shaped members each having a thickness of at most 1.5 to 2 mm is shaped by extrusion molding without deformation and strain.

In the method according to the invention, the inorganic raw material powder may be selected according to the proposed use aimed at of the ceramic shaped article from ceramic raw material powders. For example, use may be made of a high-alumina composition powder mainly consisting of $Al_2O_3$ and having a high purity for a ceramic insulation substrate for integrated circuits, a cordierite composition powder mainly consisting of $2MgO$, $2Al_2O_3$ and $5SiO_2$ for a honeycomb-body adapted for use in a catalyst carrier or a regenerator of regenerator type heat exchangers, and a cemented carbide powder mainly consisting of tungsten carbide for wear resisting linings.

Examples of the mono-liquid type resin which is a water insoluble synthetic resin dissolved in a water soluble solvent and used as a plasticizer are:

a mono-liquid type polyurethane resin available in the market under the trade name "NIPPORAN 5105" and mainly consisting of polyurethane resin dissolved in a solvent of dimethylformamide; and a mono-liquid type water insoluble resin selected from the group consisting of vinyl acetate resin and polyvinyl butyral resin dissolved in a water soluble solvent selected from the group consisting of methanol and ethanol.

In the method according to the invention, the inorganic ceramic raw material powder is kneaded with the above mentioned mono-liquid type resin to obtain a kneaded body which is then caused to be passed through slits each having a small width and provided for a metal mold under a low backpressure. During passage of the kneaded body through the metal mold, the outlet portion of the slits is filled with the kneaded body in a uniform and continuous manner. As soon as the kneaded body is extruded into a fluid having a high humidity, such as water or an atmosphere having a high humidity i.e., an aqueous fluid, the water soluble solvent is dispersed into the water and the inorganic powder is caked into a viscous rubber-like shaped article. Such shaped article is not subjected to any deformation and has a mechanical strength which is sufficient to effect succeeding operations without hindrance.

An example of the hydraulic setting resin mainly consisting of polyurethane isocyanate prepolymer, which is a hydrophilic urethane resin raw liquid, is a resin available in market under the trade name "HYCEL OH."

In the method according to the invention, the inorganic ceramic raw material power is also kneaded with the above mentioned hydraulic setting resin to obtain a kneaded body which is then caused to be passed through slits each having a small width and provided with a metal mold under a low backpressure. During passage of the kneaded body through the metal mold, the outlet portion of the slits is filled with the kneaded body in a uniform and continuous manner. As soon as the kneaded body is extruded into a fluid having a high humidity such as water or an atmosphere having a high humidity, the hydrophilic urethane resin reacts with the water and becomes polymerized to cake the inorganic powder into a hard shaped article without deformation.

In the case of extruding the hydraulic setting resin into water, the hardening speed in water is higher than that of the above mentioned mono-liquid type resin, and as a result, the hydraulic setting resin is more preferably adapted for use in the case of making a shaped article composed of assembled thin wall-shaped members and complex in construction by extrusion molding.

During the polymerization reaction of the hydrophilic urethane resin, there is produced carbonic acid gas which is likely to remain as pin holes in a sintered shaped article. As a result, the hydrophilic urethane resin is more preferably adapted for use in the case of making a porous shaped article by extrusion molding. If the hydrophilic urethane resin is used for making a dense sintered shaped article having a large thickness by extrusion molding, care should be taken with the sintering conditions such, for example, as atmosphere, operating time, and the like.

The invention will now be described in greater detail with reference to the following examples.

EXAMPLE 1

Magnesite, Gairome-clay and alumina powder were mixed to obtain a cordierite composition powder consisting of $2MgO$, $2Al_2O_3$ and $5SiO_2$. The ceramic mixture thus obtained was pulverized in a ball mill into a ceramic raw material powder of not more than $25\mu$ particle size. The ceramic raw material powder was sufficiently dried and then kneaded with the mono-liquid type polyurethane resin available in the market under the trade name "NIPPORAN 5105." The mono-liquid type polyurethane resin consists of 30 wt.% of resin component and 70 wt.% of dimethylformamide solvent. 100 volume parts (100 g) of the ceramic raw material powder was kneaded with 93.5 volume parts (30 g), 125 volume parts (40 g), 155 volume parts (50 g), 185 volume parts (60 g), and 220 volume parts (70 g) of the mono-liquid type polyurethane resin, respectively. Each kneaded body thus obtained was charged into an extrusion metal die composed of a metal sleeve having an inner diameter of 20 mm and provided at its lower end surface with a mouth piece having an extrusion opening of 20 mm (width)×0.3 mm (thickness). Then, to the kneaded body in the extrusion metal die was applied a pressure of 0.25 $Kg/mm^2$ to extrude it at a speed of about 2 mm/sec. into a water tank whose water level was located just below the lower end of the mouthpiece of the extrusion metal die by 3 mm.

The ceramic shaped articles thus obtained were optimum when the volume ratio of the ceramic raw material powder to the mono-liquid type polyurethane resin was 100:155 to 185. That is, each ceramic shaped article taken out of the water tank had a suitable hardness and elasticity which is necessary for succeeding processes such as a sintering process during which the ceramic shaped article must not be deformed. The ceramic shaped articles whose volume ratios of the ceramic raw material powder to the mono-liquid type polyurethane resin are 100:125 and 100:93.5, respectively, resulted in a decrease in their fluidity and showed cracks therein. But, when the ceramic shaped articles were made by extrusion molding from these kneaded bodies further added with 12.5 and 25 volume parts of acetone, respectively, the ceramic shaped articles thus obtained did not show any cracks as well as in the case of the ceramic shaped article obtained from the kneaded body whose volume ratio of the ceramic raw material powder to the mono-liquid type polyurethane resin is 100:155.

Since acetone is water insoluble, when considerable acetone was added to the kneaded body, that is, 25 volume parts of acetone was added to the kneaded body, the effect of increasing viscosity or hardness of the extruded body in contact with water is somewhat insufficient, and as a result, certain care must be taken for its handling. On the other hand, if the volume ratio of the raw material powder to the polyurethane resin was 100:220, the kneaded body obtained tends to make it rather too soft. As a result, care must also be taken for its handling similar to the above mentioned case wherein the volume ratio of the ceramic raw material powder to the mono-liquid polyurethane resin was 100:93.5 and 25 volume parts of acetone was added thereto. But, in practice both of the above two processes can be carried out without any objection.

Heretofore, it has been proposed to mix the above mentioned cordierite composition powder with a plasticizer selected from the group consisting of dibutyl phthalate, dimethyl phthalate and dioctyl phthalate, a resin binder selected from the group consisting of polyvinyl butyral, ethyl cellulose and acryl resin, and a solvent selected from the group consisting of toluene, acetone and xylene, and an elongate strip of 20 mm (width)×0.5 mm (thickness) is made by extrusion molding adopting the above-mentioned plasticizer, resin binder and solvent. But, during the extrusion molding, there was found the disadvantage that the frictional resistance against the extrusion became too large to effect the extrusion, and that even when the extrusion was possibly made, the strip thus obtained became deformed immediately after the extrusion, and as a result, it was impossible to extrude into a usable shaped article.

In the method according to the invention, for example, use was made of a kneaded body consisting of 100 volume parts of a cordierite composition powder and 155 volume parts of the above mentioned mono-liquid type polyurethane resin. The kneaded body was subjected to extrusion molding to obtain a strip of 140 mm (length)×20 mm (width)×0.3 mm (thickness). This strip was cut into two strip portions each having a length of 70 mm. These two strip portions were heated in an electric furnace at a temperature rising at a rate of 200° C./hr to 1,380° C. and 1,410° C., respectively, and fired at these temperatures for 2 hours to obtain the following sintered articles each having no strain and curvature.

Table

| Sintering temperature (°C.) | Porosity (%) | Water absorbing rate (%) | Apparent specific weight | Dimension of sintered article (mm) | | |
|---|---|---|---|---|---|---|
| | | | | Width | Thickness | Length |
| 1,380 | 1.7 | 0.7 | 2.60 | 15.9 | 0.23 | 55.2 |
| 1,410 | 0.2 | 0.03 | 2.56 | 15.4 | 0.22 | 53.5 |

EXAMPLE 2

100 volume parts (100 g) of ceramic raw material powder containing a high-alumina composition consisting of 94 wt.% of $Al_2O_3$, 3 wt.% of $SiO_2$ and 1.5 wt.% of CaO was kneaded with 145 volume parts (40 g) of mono-liquid type polyurethane resin to obtain a kneaded body. This kneaded body was subjected to extrusion molding in water by means of an extruding die provided with a mouth piece having an extrusion opening of 20 mm (width)×0.3 mm (thickness) to obtain an elongate strip. The elongate strip thus obtained was cut into strip portions each having a length of 70 mm and these strip portions were heated at a temperature rising at a rate of 200° C./hr and then were maintained at 1,620° C. for 2 hours to form sintered high-alumina ceramic strips each having a dimension of 16 mm (width)×0.23 mm (thickness)×55.3 mm (length). The sintered strip thus obtained has substantially no strain and curvature and is useful as an electronic circuit insulating substrate.

EXAMPLE 3

100 volume parts (100 g) of cemented carbide consisting of 93 wt.% of WC and 7 wt.% of Co was kneaded with 105 volume parts (7 g) of mono-liquid type polyurethane resin to form a kneaded body. The kneaded body was then subjected to extrusion molding in water by means of an extruding device provided with a mouthpiece having an extrusion opening of 20 mm (width)×0.3 mm (thickness) to obtain an elongate strip. The elongate strip thus obtained was cut into strip portions each having a length of 70 mm. Then, these strip portions were sintered in a hydrogen furnace at a temperature rising at a rate of 200° C./hr and then were maintained at 1,480° C. for 1 hour to form sintered cemented carbide blades each having a dimension of 14.8 mm (width)×0.23 mm (thickness)×54.0 mm (length) which showed no strain and curvature.

In the above examples, strip-shaped bodies have been described as specific embodiments of a ceramic shaped article composed of thin wall-shaped members, but it has been recognized that the use of the above mentioned mono-liquid type polyurethane resin also ensures manufacture of a honeycomb body, having a considerably large number of openings separated from each other by a number of thin partition walls each having a thickness of about 0.2 mm.

EXAMPLE 4

Magnesite, Gairome-clay and alumina powder were mixed so as to obtain a cordierite composition powder consisting of $2MgO$, $2Al_2O_3$ and $5SiO_2$. The ceramic mixture thus obtained was pulverized in a ball mill to a raw material powder of not more than $25\mu$ particle size. The raw material powder was sufficiently dried and 100 volume parts (100 g) of the dried raw material powder was kneaded with 100 volume parts (45 g) of hydraulic setting polyurethane resin which is available in the market as a trade name of "HAISEL OH LIQUID" to form a kneaded body. The kneaded body was charged into an extrusion die provided with a mouthpiece forming an extrusion opening of square mesh shape in section, which could extrude a honeycomb body having a number of openings each square in section and formed by partition walls each having a thickness of 0.3 mm and crossed perpendicular with each other by a pitch of 2.0 mm inside a square hollow frame of 40 mm (outer width)×40 mm (outer length)×0.3 mm (thickness). Then, to the kneaded body in the extrusion die was applied pressure of 25 Kg/cm² and the kneaded body was extruded at a speed of 2 mm/sec into a water tank whose water level is located just below the lower end of the mouthpiece of the extrusion die by 3 mm to form such an elongate honeycomb body having a considerably large number of square openings separated from each other by a number of thin partition walls as above mentioned.

The elongate honeycomb body was held in a stationary state in water and hardened and then was taken out of the water and was cut into honeycomb body portions each having a length of 100 mm.

The hydraulic setting resin was not completely reacted in the honeycomb body and hence a slight flexibility remained at the inner portion of the partition wall of the honeycomb body. Then, the honeycomb body was held stationary in the atmospheric air for 2 hours until the hydraulic setting resin substantially completed its reaction to completely harden the honeycomb body. Then, the hardened honeycomb body was heated in an electric furnace at a temperature rising at a rate of 100° C./hr and then was maintained at 1,360° C. for 2 hours to form a sintered honeycomb body of 38 mm (outer width)×38 mm (outer thickness)×95 mm (length) which was contracted from the original dimension by about 5% and showed no strain and cracks. This honeycomb body provides a porous cordierite ceramic shaped article having a number of square openings separated from each other by precise grating-shaped partition walls and having a porosity of 45% and which is most suitable for a catalyst carrier for purifying an exhaust gas from various kinds of combustion devices inclusive of an internal combustion engine of an automobile.

Experimental tests have yielded the result that it is most preferable to choose a volume ratio of the inorganic raw material powder to the hydraulic setting resin of about 100:100. If the volume ratio is 100:larger than 200 the hydraulic setting resin component becomes excessively large, and as a result, the extruded honeycomb body becomes deformed during the extrusion molding operation. On the contrary, if the amount of resin component is small and the volume ratio is on the order of 100:50 the addition of solvent ensures an increase of the fluidity of the kneaded body, thereby enabling a satisfactory honeycomb body to be obtained. If the resin component is further reduced and the volume ratio becomes 100:smaller than 50, it is necessary to add a large amount of solvent in order to obtain the required fluidity of the kneaded body. The addition of such large amounts of solvent results in an increase of the time for hardening the kneaded body and hence deformation thereof. As seen from the above, the volume ratio of the ceramic raw material powder to the hydraulic setting polyurethane resin should be 100:50 to 200 and may preferably be 100:70 to 180.

For the sake of comparison, the prior art technique was applied to the extrusion die used in the Example 4 to extrude the kneaded body into atmospheric air and obtained a honeycomb body.

But, such honeycomb-body became deformed so that it was impossible to effect the extrusion molding. If a hardened kneaded body was extruded through the extrusion die for the purpose of avoiding such deformation, a uniform shaped article with no strain and cracks could not be obtained.

What is claimed is:

1. A method of making a honeycomb-shaped ceramic article by extrusion molding, comprising the steps of kneading an inorganic ceramic raw material powder with a plasticizer formed of a resin which is a water insoluble synthetic resin dissolved in a water soluble solvent, to form a kneaded body, the volume ratio of said inorganic raw material to said plasticizer being in the range of 100:50 to 100:200, and shaping a honeycomb-shaped ceramic article by extruding said kneaded body through a shaped orifice and then into water for hardening the honeycomb-shaped ceramic article without deformation or strain.

2. A method of making a honeycomb-shaped ceramic article from an inorganic ceramic raw material powder by extrusion molding as claimed in claim 1, wherein said inorganic raw material powder is selected from the group consisting of: a cordierite composition powder mainly consisting of 2MgO, 2Al$_2$O$_3$ and 5SiO$_2$, a high-alumina composition powder mainly consisting of Al$_2$O$_3$, and a cemented carbide powder mainly consisting of tungsten carbide.

3. A method of making a honeycomb-shaped ceramic article from an inorganic ceramic raw material powder by extrusion molding as claimed in claim 1, wherein said water insoluble synthetic resin is selected from the group consisting of: polyurethane resin, vinyl acetate resin and polyvinyl butyral resin.

4. A method of making a honeycomb-shaped ceramic article from an inorganic ceramic raw material powder by extrusion molding as claimed in claim 1, wherein said water soluble solvent is selected from the group consisting of: dimethyl formaldehyde, methanol, and ethanol.

5. A method of making a honeycomb-shaped ceramic article as claimed in claim 1, wherein said honeycomb-shaped ceramic article comprising walls of thickness of not more than 1.5 to 2 mm.

6. A method of making a honeycomb-shaped ceramic article as claimed in claim 1, additionally comprising the step of sintering the shaped article after hardening in the aqueous fluid.

7. A method of making a honeycomb-shaped ceramic article as claimed in claim 1, wherein said ratio is in the range of 100:70 to 100:180.

* * * * *